United States Patent
Soni et al.

(10) Patent No.: US 10,104,264 B2
(45) Date of Patent: Oct. 16, 2018

(54) METHOD AND SYSTEM FOR GENERATING ELECTRONIC DOCUMENTS FROM PAPER DOCUMENTS WHILE RETAINING INFORMATION FROM THE PAPER DOCUMENTS

(71) Applicant: Adobe Systems Incorporated, San Jose, CA (US)

(72) Inventors: Sachin Soni, New Delhi (IN); Ashish Duggal, Delhi (IN); Anmol Dhawan, Ghaziabad (IN)

(73) Assignee: ADOBE SYSTEMS INCORPORATED, San Jose, CA (US)

(*) Notice: Subject to any disclaimer, the term of this patent is extended or adjusted under 35 U.S.C. 154(b) by 152 days.

(21) Appl. No.: 15/217,324

(22) Filed: Jul. 22, 2016

(65) Prior Publication Data
US 2018/0027143 A1    Jan. 25, 2018

(51) Int. Cl.
*H04N 1/21* (2006.01)
*G06F 17/30* (2006.01)
*G06K 9/00* (2006.01)
*H04N 1/04* (2006.01)

(52) U.S. Cl.
CPC ..... *H04N 1/2166* (2013.01); *G06F 17/30011* (2013.01); *G06K 9/00442* (2013.01); *H04N 1/04* (2013.01); *H04N 2201/0081* (2013.01)

(58) Field of Classification Search
CPC .. H04N 1/2166; H04N 1/04; G06F 17/30011; G06K 9/00496
See application file for complete search history.

(56) References Cited

U.S. PATENT DOCUMENTS

2006/0047639 A1* 3/2006 King ................. H04N 1/00244

* cited by examiner

*Primary Examiner* — Jamares Q Washington
(74) *Attorney, Agent, or Firm* — Keller Jolley Preece

(57) ABSTRACT

A method for adding electronic properties to an electronic document is provided. The method includes generating the electronic document from a paper document. Content is then identified from the electronic document. An electronic copy of the electronic document is searched using the content. Electronic properties of the content are extracted from the electronic copy and applied to the content of the electronic document.

20 Claims, 9 Drawing Sheets

METHOD AND SYSTEM FOR GENERATING ELECTRONIC DOCUMENTS FROM PAPER DOCUMENTS WHILE RETAINING INFORMATION FROM THE PAPER DOCUMENTS

BACKGROUND

Often, people create an electronic document from a paper document by scanning the paper document or capturing the paper document using a camera. The electronic document, so created, lacks many electronic properties as compared to an original electronic document from which the paper document was created. For example, the original electronic document may have a video or a slideshow or an animation which is lost due to the creation of the paper document. The electronic document created from the paper document also lacks such video or slideshow or animation. In addition, if the paper document is a black and white print of the original electronic document that contains colored content then color properties are also not present in the paper document and hence, also absent from the electronic document created from the paper document. Therefore, the electronic document, created from the paper document, significantly lacks electronic properties which are otherwise present in the original electronic document.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for adding electronic properties to an electronic document generated from a paper document is provided. The method includes generating the electronic document from the paper document. Content is then identified from the electronic document. An electronic copy of the electronic document is searched using the content. Electronic properties of the content are extracted from the electronic copy and applied to the content of the electronic document.

An apparatus for adding electronic properties to an electronic document is also provided. The apparatus includes a memory and one or more processors. The processors are electronically coupled to the memory and are configured to perform a method for adding electronic properties to the electronic document in conjunction with the memory. The method includes identifying content of the electronic document. An electronic copy of the electronic document is then searched using the content. Electronic properties of the content are extracted from the electronic copy and applied to the content of the electronic document.

A non-transient computer readable medium for storing computer instructions that when executed by at least one processor causes the at least one processor to perform a method for adding electronic properties to an electronic document is also provided. The method includes generating the electronic document that lacks electronic properties. Content is then identified from the electronic document. An electronic copy of the electronic document is searched using the content. Electronic properties of the content are extracted from the electronic copy and applied to the content of the electronic document.

Figure 1:
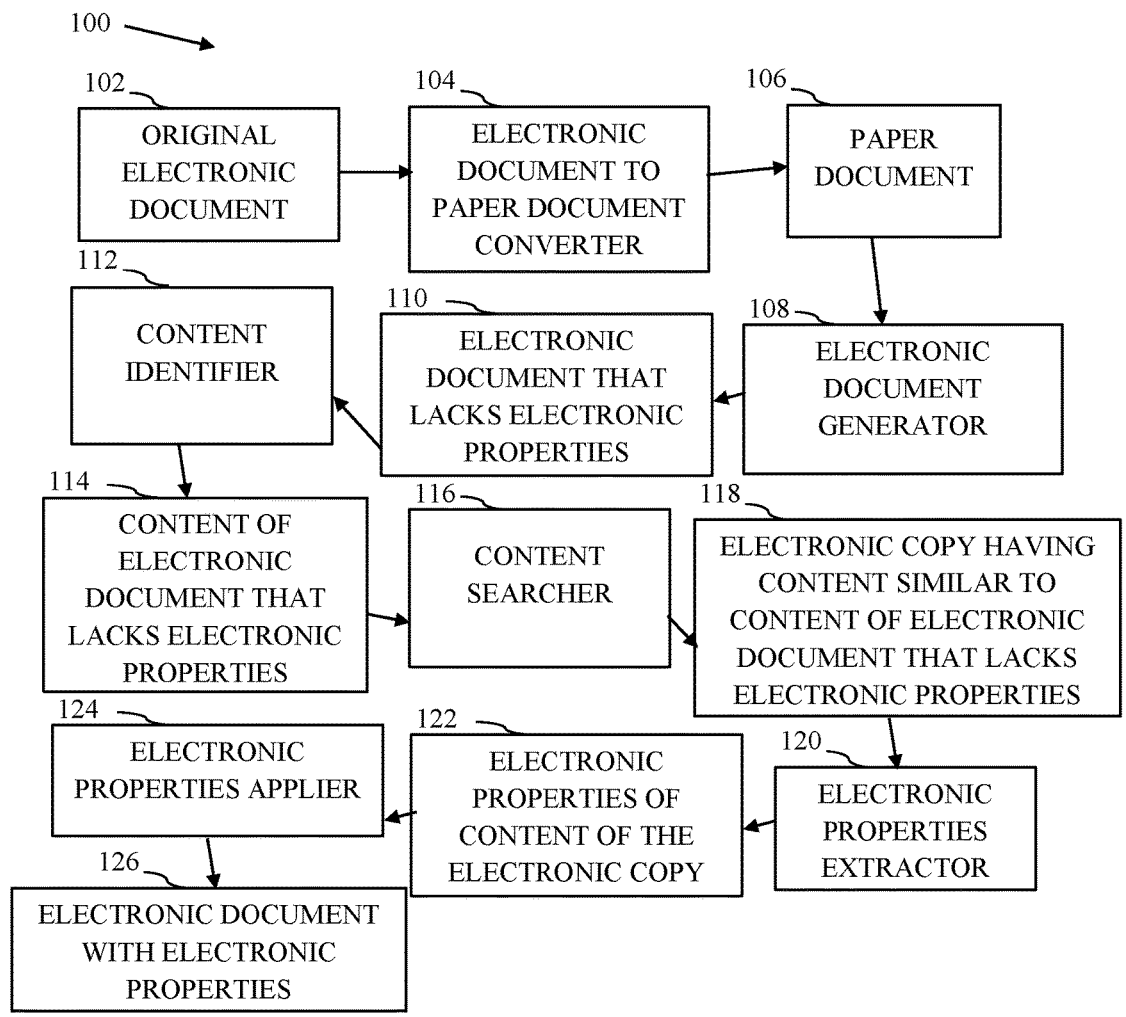
FIG. 1 is a block diagram of a workflow for adding electronic properties to content of an electronic document, according to one or more embodiments.

While the method and apparatus is described herein by way of example for several embodiments and illustrative drawings, those skilled in the art will recognize that the method and apparatus provided herein is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. Moreover, although the terms "step" and/or "block" are used herein to connote different elements of methods employed, the terms should not be interpreted as implying any particular order among or between various steps herein disclosed unless and except when the order of individual steps is explicitly described.

DETAILED DESCRIPTION OF EMBODIMENTS

Overview

In accordance to embodiments of the present invention and as described in more detail below, a method for adding electronic properties to an electronic document is provided.

In one embodiment, the electronic document is generated from a paper document by scanning the paper document or capturing the paper document using a camera or a scanner. The electronic document lacks electronic properties as compared to an original electronic document from which the paper document was created. Electronic properties include property associated with content of the original electronic document which is absent from the paper document. The electronic document is then processed to identify content of the electronic document. For example, the content can be identified using text recognition techniques. A search is then conducted using the content of the electronic document. The search can be conducted in a pre-defined repository, such as Adobe® Document Cloud, or any other repository using world wide web search engines. A document having content similar to the content of the electronic document is searched. An electronic copy of the electronic document is identified as a result of the search. The electronic copy can be the original electronic document or any other electronic document that includes the content. For example, the electronic copy can be in a portable document format (PDF) or HTML (Hyper Text Mark-up Language) format. Electronic properties of the content are extracted from the electronic copy by parsing the electronic copy. The extraction includes parsing the electronic copy to search for the electronic properties. For example, the content in the electronic copy can include tags indicating if an element of the content is a video, or text or image. Similarly, the content includes a path defining coordinates of a box of the video. Existing techniques can be used for parsing the content to extract the electronic properties. The electronic properties are then applied to the content of the electronic document to compensate for the loss of the electronic properties that occurred during creation of the paper document and during scanning of the paper document. The addition of the electronic properties also makes the electronic document similar to the original electronic document. The addition includes modifying the electronic document to update tags for the content, add path or coordinates to the content, add color attributes, add hyperlink, and the like.

In some embodiments, the electronic document generated from the paper document is fragmented. Fragmentation refers to dividing content of the electronic document into one or more fragments. Examples of the fragments include, but are not limited to, pages, sections, topics, sub-topics or paragraphs. The content of each fragment is identified and searched. An electronic copy corresponding to each fragment is then identified. From each electronic copy, electronic properties associated with corresponding content is extracted and then applied to respective content in the electronic document. As a result, the electronic document having electronic properties applied to the content of various fragments is generated. The fragmentation can be done in various scenarios, such as if the paper document is created from a plurality of original electronic documents, or if no single electronic copy is identified during searching.

In one embodiment, the document having content exactly similar to the electronic document is identified as the electronic copy. In another embodiment, the document having at least document-threshold-value of similarity with the content of the electronic document is identified as the electronic copy. The document-threshold-value can be set manually or can be set automatically based on heuristics or machine learning. The document-threshold-value signifies a confidence level of similarity between the electronic copy and the electronic document to ensure that appropriate electronic properties are applied to the content of the electronic document. Similarly, when a fragment level search is done then in some embodiments, a document fragment having at least fragment-threshold-value of similarity with the content of the fragment of the electronic document is identified as relevant fragment of the electronic copy. The fragment-threshold-value can be set manually or can be set automatically based on heuristics or machine learning. The fragment-threshold-value signifies a confidence level of similarity between the fragment of the electronic copy and the fragment of the electronic document to ensure that appropriate electronic properties are applied to the content of the fragment of the electronic document.

Terms Descriptions (in Addition to Plain and Dictionary Meaning of the Terms)

A paper document is a document that lacks electronic properties. The paper document is, typically, created by printing an electronic document.

An electronic document is a document that can be accessed electronically. The electronic document created from the paper document does not have electronic properties similar to original electronic document from which the paper document was created. The electronic document is processed to enable addition of the electronic properties to the content of the electronic document.

Electronic properties of an electronic document include properties that the electronic document contains by virtue of the electronic document being electronic and that the electronic document loses when a paper document is created from the electronic document. Examples of the electronic properties include, but are not limited to, color properties, electronic styling information, paragraph styling information, font information, hyperlinks, URLs (Uniform Resource Locators), videos, animations, slideshows, any electronic property absent in the paper document, and the like.

Content of the electronic document that lacks electronic properties includes text or images present in the electronic document.

An electronic copy is a document that is identified as a search result having at least document-threshold-value of similarity with the content of the electronic document. The electronic copy contains electronic properties.

A document-threshold-value indicates a confidence level of similarity between the electronic copy and the electronic document. The document-threshold-value can be set manually or can be set automatically based on heuristics or machine learning. If two documents do not have at least document-threshold-value of similarity then the two documents are not similar and hence, are not shown as a search result for each other.

A fragment-threshold-value indicates a confidence level of similarity between a fragment of the electronic copy and a fragment of the electronic document. The fragment-threshold-value can be set manually or can be set automatically based on heuristics or machine learning. If two fragments do not have at least fragment-threshold-value of similarity then the two fragments are not similar and hence, are not shown as a search result for each other. A document that includes the fragment having the fragment-threshold-value of similarity with the fragment of the electronic document is referred to as the electronic copy, in some embodiments.

A page-threshold-value indicates a confidence level of similarity between a page of the electronic copy and a page of the electronic document. The page-threshold-value can be set manually or can be set automatically based on heuristics or machine learning. If two pages do not have at least page-threshold-value of similarity then the two pages are not similar and hence, are not shown as a search result for each other. A document that includes the page having the page-threshold-value of similarity with the page of the electronic document is referred to as the electronic copy, in some embodiments.

In the following discussion, an "Example Workflow" is first described that indicates the method followed by an "Example Environment" that is operable to employ methods described herein. Following this, a section entitled "Example Apparatuses" describes examples of apparatuses in accordance with one or more embodiments. "Example Methods" describes examples of methods in accordance with one or more embodiments.

Example Workflow

FIG. 1 is a block diagram of a workflow 100 for adding electronic properties to an electronic document, according to one or more embodiments.

At block 102, an original electronic document 102 is shown. The original electronic document includes content and electronic properties. The electronic properties, as described herein, includes electronic properties that are lost during printing or creation of a paper document 106 from the original electronic document 102. The paper document 106 is created from the original electronic document 102 using an electronic document to paper document converter 104 (hereinafter referred to as the converter 104) and in response to an input from a user. Example of the converter 104 includes, but is not limited to, a printer. The paper document 104 lacks the electronic properties. Examples of the electronic properties include, but are not limited to, color properties, video, animation, slideshow, hyperlinks and other properties present in the original electronic document 102 but absent from the paper document 106.

An electronic document generator 108 generates an electronic document 110 from the paper document 104 in response to another input from the user or any other user. The electronic document 110 lacks electronic properties as it is created from the paper document 106 that lacks the electronic properties. Examples of the electronic document generator 108 include, but are not limited to, a camera, a scanner, and the like. For example, if the converter 104 is a black and white printer then color properties of the original electronic document 102 are absent from the paper document 106 and also, the electronic document 110. Similarly, if the original electronic document 102 includes a video then the paper document 106 and hence, the electronic document 110 lacks the video.

Figure 3:
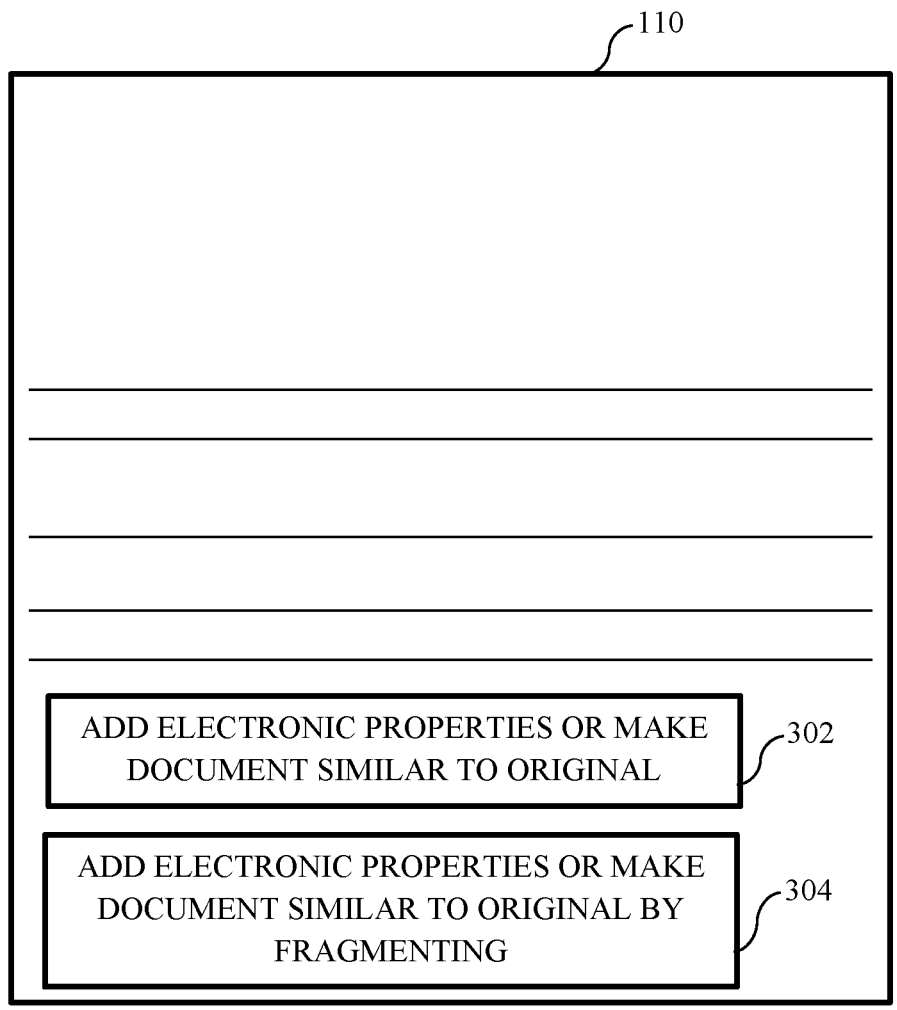
FIG. 3 depicts an electronic document that lacks electronic properties, according to one embodiment.

In illustrated embodiment, the user who provided the input to create the electronic document 110 desires to add electronic properties to the electronic document 110 to make the electronic document 110 similar to the original electronic document 102. The user provides yet another input to add electronic properties to the electronic document 110. The user can provide the input by making a gesture or clicking a button 302 as shown in FIG. 3. A content identifier 112 then identifies the content 114 of the electronic document 110 in response to the input from the user. Examples of the content identifier 112 include, but are not limited to, text recognition engine, optical character recognition engine, and the like.

The content 114 that lacks the electronic properties is then used for searching an electronic copy 118 having content similar to the content 114. The searching is performed using a content searcher 116. Examples of the content searcher 116 includes, but are not limited to, a world wide web search engine, a proprietary search engine or any other search engine. In some embodiments, the electronic copy 118 may not have content exactly similar to the content 114 but has content having at least document-threshold-value of similarity with the content 114. The document-threshold-value is minimum amount of similarity that two documents have for one document to show up as a search result for another. The electronic copy 118 can be the original electronic document 202 identified as a search result or can be another electronic copy of the original electronic document 202 or a modified document with minimal modifications and generated from the original electronic document 202.

An electronic properties extractor 120 extracts electronic properties 122 of the content of the electronic copy 118. Example of the electronic properties extractor 120 includes, but is not limited to, a parsing engine. An electronic properties applier 124 then applies the electronic properties 122 to the content 114 to generate an electronic document 126 with electronic properties from the electronic document 110 that lacks electronic properties.

Example Environment

Figure 2:
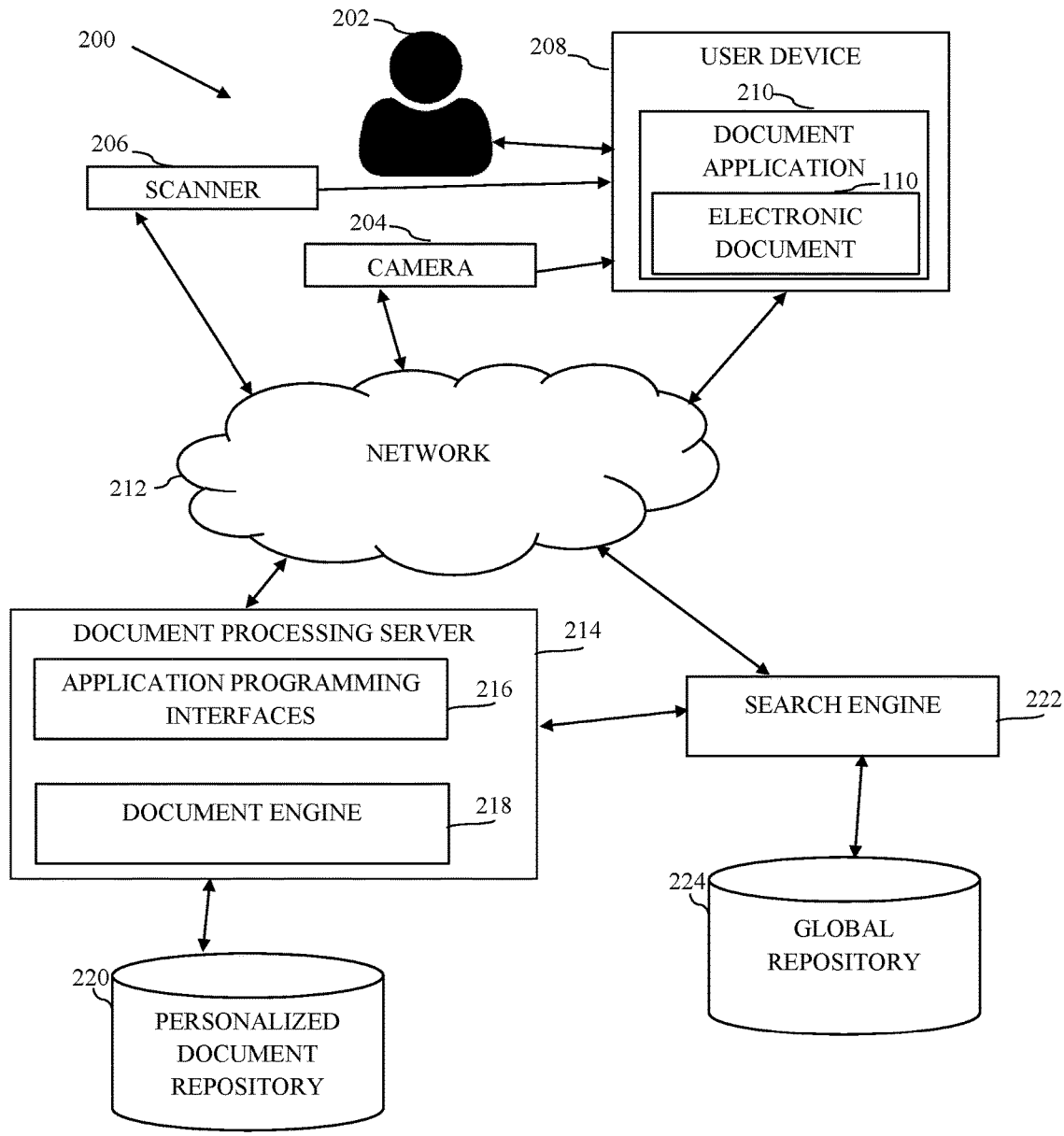
FIG. 2 is a block diagram of an environment using which various embodiments of the invention may be practiced.

FIG. 2 is a diagram of an environment 200 for adding electronic properties to an electronic document, according to one or more embodiments. The environment 200 includes a user device 208 using which a user 202 accesses one or more documents. In illustrated embodiment, the user device 208 has a document application 210 using which the user 202 accesses an electronic document 110. The electronic document lacks electronic properties and is generated from a paper document using a converter, such as a camera 204 or a scanner 206. The converter captures content of the paper document and passes the content to the document application 210 which generates the electronic document 110 from the content. Example of the document application 210 include, but are not limited to, Adobe® Acrobat®, Adobe® Reader®, or any other application that generates and provides access to the electronic document 110. The generation of the electronic document 110 can be triggered from within the document application 210. The document application 210 can provide a workflow to generate the electronic document 110. For example, the document application 210 can include a button "Generate scanned document" which is pressed by the user 202 to initiate the generation process. The user 202 then uses the scanner 206 or the camera 204 to capture content of the paper document 106 and the content of the paper document 106 is provided to the document application 210 for the generation of the electronic document 110.

The document application 210 includes one or more components for generating the electronic document 110 and processing the electronic document 110 further. The document application 210 is explained in detail in conjunction with FIG. 5.

In illustrated embodiment, the user 202 desires to add electronic properties to the electronic document 110 to make it similar to the original electronic document 102. The user 202 makes a gesture or clicks on the button 302 to indicate the desire. The electronic document 110 is then processed to identify content of the electronic document. In one embodiment, the processing is performed on the user device 208 by the document application 210. In another embodiment, the processing is performed on a document processing server 214 connected to the user device 208 via a network 212. In yet another embodiment, the processing is done partly on the user device 208 and partly on the document processing server 214.

The document processing server 214 includes a document engine 218 whose functionalities are exposed via application programming interfaces (APIs) 216. The document processing server 214 is also connected to document repository 220 having personalized information for different users and hence, is also referred to as personalized document repository 220. The document processing server 214 is explained in detail in conjunction with FIG. 4A and FIG. 4B.

The document processing server 214 or the user device 208 is also connected to a search engine 222 via the network 212 or directly. The document processing server 214 or the user device 208 sends content to the search engine 222 for searching and the search engine 222 reports search results back to the document processing server 214 or the user device 208. The search engine 222 has access to worldwide and global repositories, such as a global repository 224.

In various embodiments, processing performed by the user device 208 or the document processing server 214 or both includes identifying content of the electronic document 110, searching the electronic copy 114, extracting electronic properties 122 from the content of the electronic copy 114, and applying the electronic properties 122 to the content of the electronic document 110 to make the electronic document 110 similar to the original electronic document 102.

Example Apparatuses

Functional Description of Apparatuses

Figure 4A:
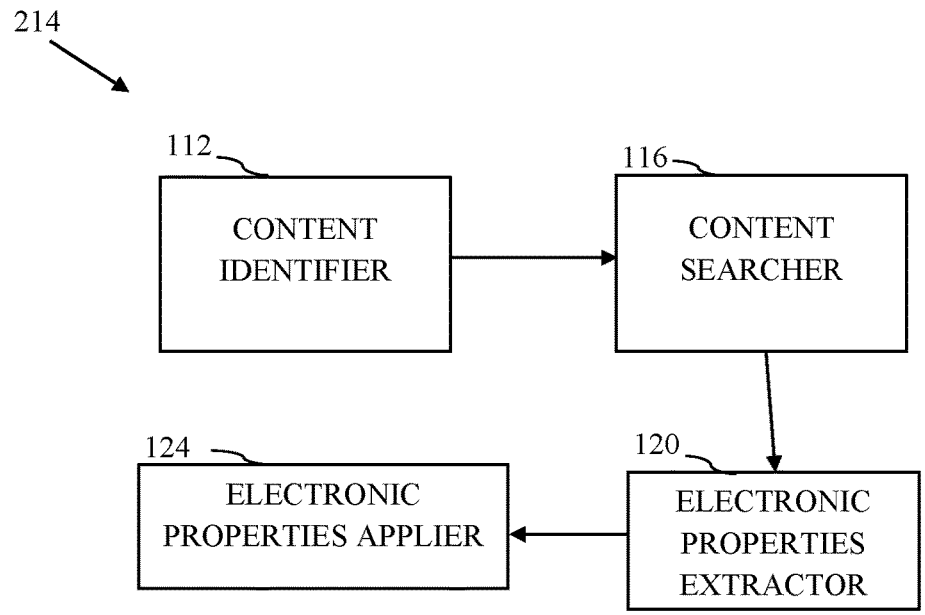
FIG. 4A is a block diagram of an apparatus for adding electronic properties to an electronic document, according to one embodiment.

FIG. 4A is a block diagram of an apparatus, such as the document processing server 214, for adding electronic properties to an electronic document, in accordance to one embodiment.

The document processing server 214 includes the content identifier 112 for identifying content 114 of the electronic document 110 that lacks electronic properties 122. The content identifier 112 receives the electronic document 110 in response to access of the electronic document 110 and click on the button 302 or an equivalent gesture. The content 114 that lacks the electronic properties 122 is then used for searching the electronic copy 118 having content similar to the content 114. The searching is performed using the content searcher 116. In some embodiments, the electronic copy 118 may not have content exactly similar to the content 114 but has content having at least document-threshold-value of similarity with the content 114. The document-threshold-value is minimum amount of similarity that two documents have for one document to show up as a search result for another.

In one embodiment, the search is performed by the document processing server 214 in a personalized repository of the user 202. For example, the user 202 may want to search only in a personal repository. In another embodiment, the search is performed globally using a world wide web search engine.

The electronic properties extractor 120 extracts electronic properties 122 of the content of the electronic copy 118. The electronic properties applier 124 then applies the electronic properties 122 to the content 114 to generate the electronic document 126 with electronic properties from the electronic document 110 that lacks electronic properties.

Figure 4B:
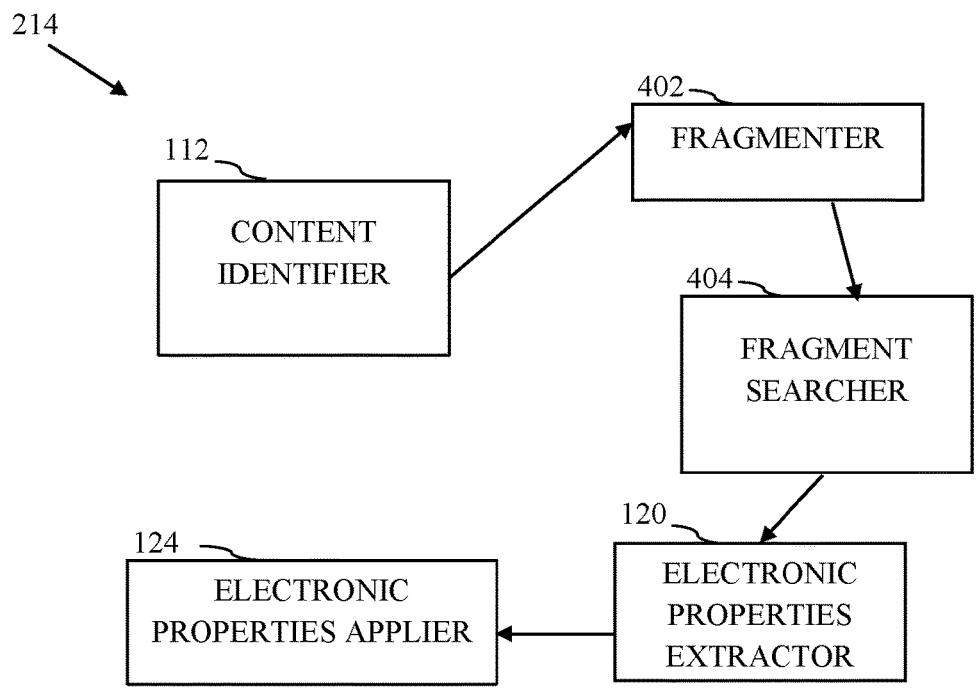
FIG. 4B is a block diagram of an apparatus for adding electronic properties to an electronic document, according to another embodiment.

FIG. 4B is a block diagram of an apparatus, such as the document processing server 214, for adding electronic properties to an electronic document, in accordance to one embodiment.

The document processing server 214 includes the content identifier 112 for identifying content 114 of the electronic document 110 that lacks electronic properties 122. The content identifier 112 receives the electronic document 110 in response to access of the electronic document 110 and click on a button 304 or an equivalent gesture. For better search results and accuracy of electronic properties 122, the user 202 may want to fragment the content 114 and then process the fragmented content. Hence, the user 202 may click on the button 304 instead of button 302. Alternatively, the user 202 may click on the button 304 when no search result is found upon clicking the button 302 or the user 202 is not happy with the search results.

The content 114 is fragmented by a fragmenter 402. The fragmenter 402 can use any existing technique for fragmenting the content 114. The user 202 may also manually provide some inputs to modify the fragments or to help in fragmenting. The content 114 is then processed fragment by fragment. First fragment that lacks the electronic properties 122 is then used for searching the electronic copy 118 having content similar to the first fragment. The searching is performed using the content searcher 116 have one or more fragment searcher 404. In some embodiments, the electronic copy 118 may not have content exactly similar to the first fragment but has content having at least fragment-threshold-value of similarity with the first fragment. The fragment-threshold-value is minimum amount of similarity that two fragments have for one fragment to show up as a search result for another. The electronic properties extractor 120 extracts electronic properties 122 of the first fragment. The electronic properties applier 124 then applies the electronic properties 122 to the first fragment to generate modified first fragment that has electronic properties 122. Similarly, other fragments are processed one by one or in parallel. For example, a second fragment is used for searching followed by extraction of the electronic properties 122. The respective electronic properties 122 of various fragments are applied to respective fragments to generate the electronic document 126 with electronic properties from the electronic document 110 that lacks electronic properties 122.

In one embodiment, the fragmentation is completely automated. For example, the document processing server 214 can process the electronic document page by page. Whenever a hit for a page is found, the document processing server 214 can increase a first fragment value from a page to two pages and so on. The first fragment can be expanded until a hit for newly added page in the first fragment is found. If a hit is not found, then current page is not considered in the first fragment. A second fragment is then started from the current page and same iterative process is performed as done for the first fragment.

In yet another embodiment, the fragmentation is completely automated and is based on heuristics or metadata of the electronic document 110. For example, if the electronic document 110 already has section level division or information then that can be used for creating section based fragments. Similarly, each page can be considered as a fragment and hence, page level fragmentation can be done.

In various scenarios, when a fragment is equal to a page then the fragment-threshold-value is referred to as page-threshold-value.

A document having the first fragment with corresponding electronic properties is identified as the search result and is referred to as the electronic copy 118. A document having the second fragment with corresponding electronic properties is identified as the search result and is also referred to as the electronic copy 118. The term electronic copy 118 is used herein to indicate the document which is currently identified as a search result and is processed. It is to be appreciated that the electronic copy 118 can have one or more documents such as the first document, the second document, and so on.

The fragments may be present in multiple documents when the original electronic document 102 has been split into one or more documents. Alternatively, the fragments may be present in multiple document when the paper document is printed from multiple electronic documents and collated into one paper document. It is to be appreciated that there can be various other scenarios in which the fragments may be present in multiple electronic documents.

Figure 5:
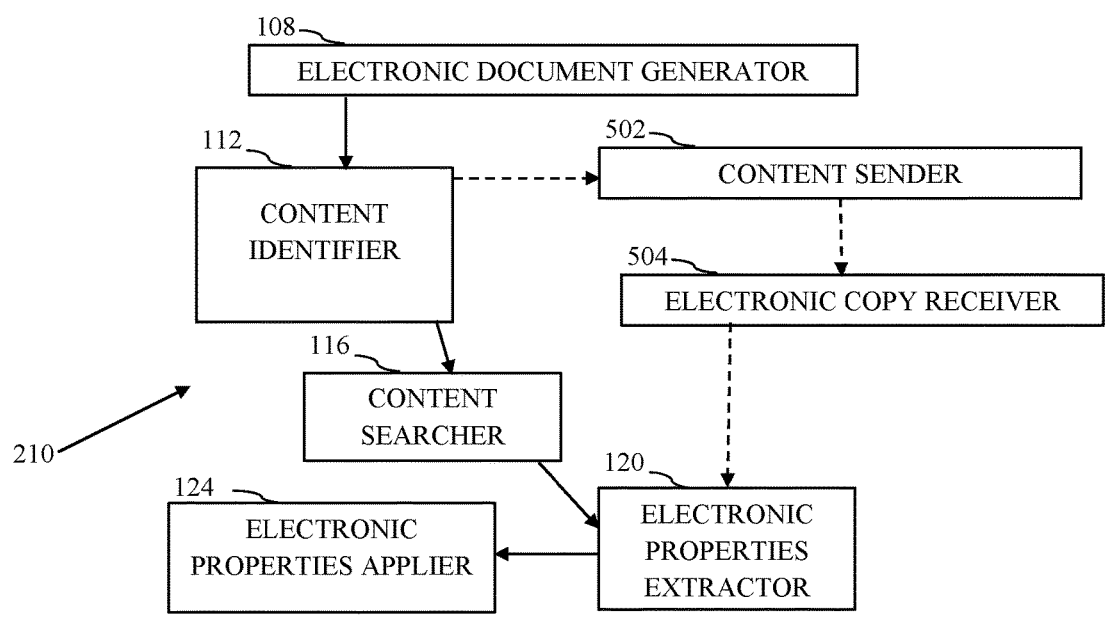
FIG. 5 is a block diagram of another apparatus for adding electronic properties to an electronic document, according to one embodiment.

FIG. 5 is a block diagram of an apparatus, such as the document application 210, for adding electronic properties to an electronic document, in accordance to one embodiment.

The document application 210 includes the electronic document generator 108 to generate the electronic document 110 from the paper document 104 in response to an input from the user. The electronic document generator 108 receives scanned content from the camera 204 or the scanner 206 and creates the electronic document 110. The electronic document 110 lacks the electronic properties 122 as it is created from the paper document 106 that lacks the electronic properties 122.

The document application 210 also includes the content identifier 112 for identifying content 114 of the electronic document 110 that lacks electronic properties 122. The content identifier 112 receives the electronic document 110 in response to access of the electronic document 110 and click on the button 302 or an equivalent gesture. The content 114 that lacks the electronic properties 122 is then used for searching the electronic copy 118 having content similar to the content 114. The searching is performed using the content searcher 116. In some embodiments, the electronic copy 118 may not have content exactly similar to the content 114 but has content having at least document-threshold-value of similarity with the content 114. The document-threshold-value is minimum amount of similarity that two documents have for one document to show up as a search result for another.

In one embodiment, the search is performed by the document application 210 in a personalized repository of the user 202. For example, the user 202 may want to search only in a personal repository present on the user device 208 or elsewhere. In another embodiment, the search is performed globally using a world wide web search engine or using the document processing server 214. In such embodiment, the document application 210 includes a content sender 502 for sending the content 114 for searching and an electronic copy receiver 504 for receiving the electronic copy 118.

The electronic properties extractor 120 extracts electronic properties 122 of the content of the electronic copy 118. The electronic properties applier 124 then applies the electronic properties 122 to the content 114 to generate the electronic document 126 with electronic properties from the electronic document 110 that lacks electronic properties.

Hardware Description of Apparatus

Figure 6:
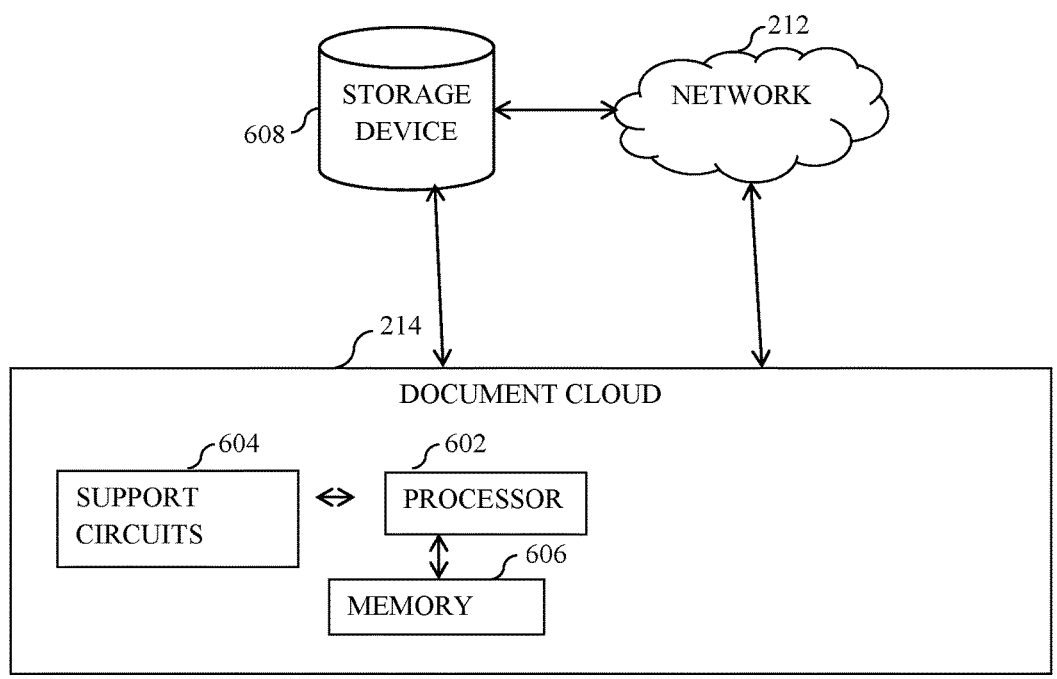
FIG. 6 is a block diagram indicating structure of the apparatus for adding electronic properties to an electronic document, according to one embodiment.

FIG. 6 is a block diagram of an apparatus, such as the document processing server 214, for adding the electronic properties 122 to the electronic document 110, according to one or more embodiments.

The document processing server 214 is connected to a storage medium or device 608 via the network 212, or directly. The document processing server 214 can be present at one single location or can be present at different locations in a distributed environment. One or more document processing server 214 may be utilized to carry out embodiments described herein. Each document processing server 214 is capable of accessing the Internet, such as the World Wide Web. The document processing server 214 takes on a variety of forms, such as a personal computer (PC), a server, a desktop computer, a processing unit, any combination of these devices, or any other suitable device having one or more processors. Further, the document processing server 214 includes one or more processors 602, and one or more computer-readable media. The computer-readable media may include computer-readable instructions executable by the one or more processors 602. The one or more processors 602 further includes multiple elements, for examples as shown in FIG. 4A and FIG. 4B, to perform various portions or steps of adding the electronic properties 122 to the electronic document 110.

The document processing server 214 includes one or more processors 602 (also referred to as the processors 602), support circuits 604, and a memory 606. The processors 602 include one or more commercially available microprocessors or microcontrollers that facilitate data processing and storage. The various support circuits 604 facilitate the operation of the processors 602 and include one or more clock circuits, power supplies, cache, input/output circuits, and the like. The memory 606 includes at least one of Read Only Memory (ROM), Random Access Memory (RAM), disk drive storage, optical storage, removable storage or the like. The memory 606 includes an operating system, and a processing engine. The operating system 606 includes various commercially known operating systems.

The document processing server 214 may further include one or more input devices (not shown in FIG. 6) connected to the document processing server 214. Examples of the one or more input devices include, but are not limited to, peripheral devices, keyboard, mouse etc. In some embodiments, the document processing server 214 may not be connected to the input devices separately and may have functionalities of these input devices built into the document processing server 214, such as in cases in which the document processing server 214 is touch enabled device, gesture enabled device, or paired to such similar devices that act as the input devices.

The storage device 608 is, for example, a storage drive or a storage system, or a distributed or shared storage system.

Examples of the network 212 include, but are not limited to, internet, local area network (LAN), wireless area network, wired area network etc.

Figure 7:
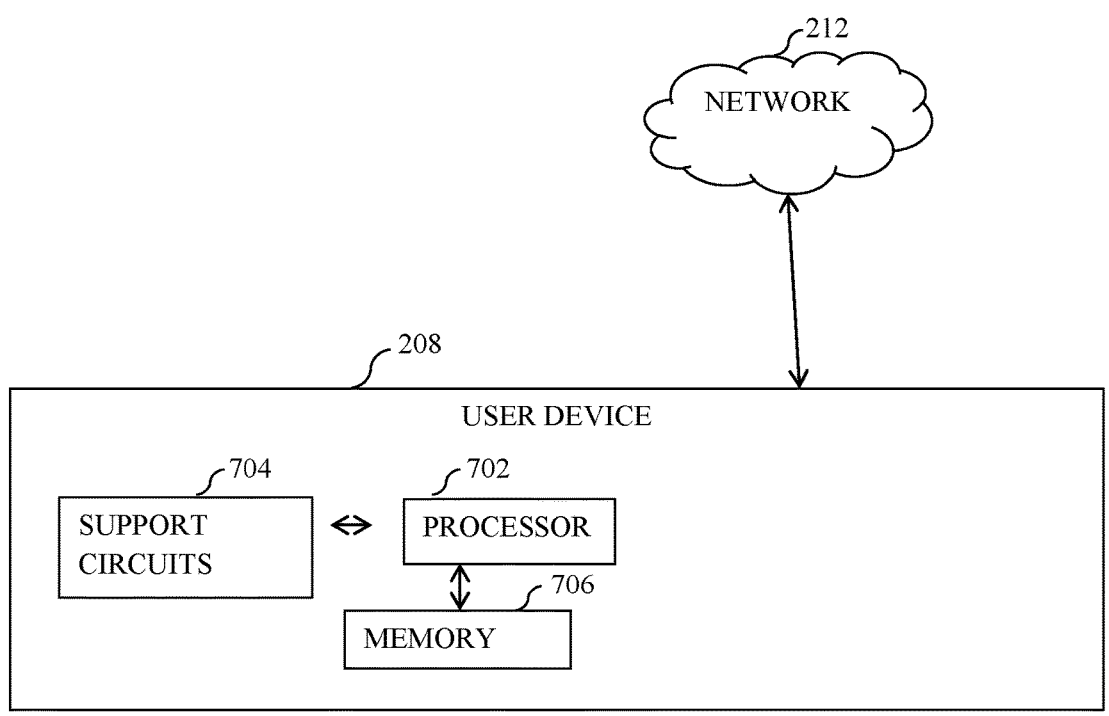
FIG. 7 is a block diagram indicating structure of another apparatus for adding electronic properties to an electronic document, according to another embodiment.

FIG. 7 is a block diagram of an apparatus, such as the user device 208, for adding the electronic properties 122 to the electronic document 110, according to one or more embodiments.

The user device 208 is connected to a storage medium or device (not shown) via the network 212, or directly. In some embodiments, the user device 208 includes the storage device, such as a local hard drive. The user device 208 is capable of accessing the Internet, such as the World Wide Web. The user device 208 takes on a variety of forms, such as a personal computer (PC), tablet computer, a desktop computer, a processing unit, any combination of these devices, or any other suitable device having one or more processors. Further, the user device 208 includes one or more processors 702 that have the document application 210 running, and one or more computer-readable media. The computer-readable media may include computer-readable instructions executable by the one or more processors 702. The one or more processors 702 further includes multiple elements, for examples as shown in FIG. 5, to perform various portions or steps of adding the electronic properties 122 to the electronic document 110 through the document application 210 running on the one or more processors 702.

The user device 208 includes one or more processors 702 (also referred to as the processors 702), support circuits 704, and a memory 706. The processors 702 include one or more commercially available microprocessors or microcontrollers that facilitate data processing and storage. The various support circuits 704 facilitate the operation of the processors 702 and include one or more clock circuits, power supplies, cache, input/output circuits, and the like. The memory 706 includes at least one of Read Only Memory (ROM), Random Access Memory (RAM), disk drive storage, optical storage, removable storage or the like. The memory 706 includes an operating system, and a processing engine. The operating system 706 includes various commercially known operating systems.

The user device 208 may further include one or more input devices (not shown in FIG. 6) connected to the user device 208. Examples of the one or more input devices include, but are not limited to, peripheral devices, keyboard, mouse etc. In some embodiments, the user device 208 may not be connected to the input devices separately and may have functionalities of these input devices built into the user device 208, such as in cases in which the user device 208 is touch enabled device, gesture enabled device, or paired to such similar devices that act as the input devices.

Examples of the network 212 include, but are not limited to, internet, local area network (LAN), wireless area network, wired area network etc.

The algorithms and methods for performing various operations of the document processing server 214 or the document application 210 are now explained in conjunction with example methods.

Example Methods

Figure 8:
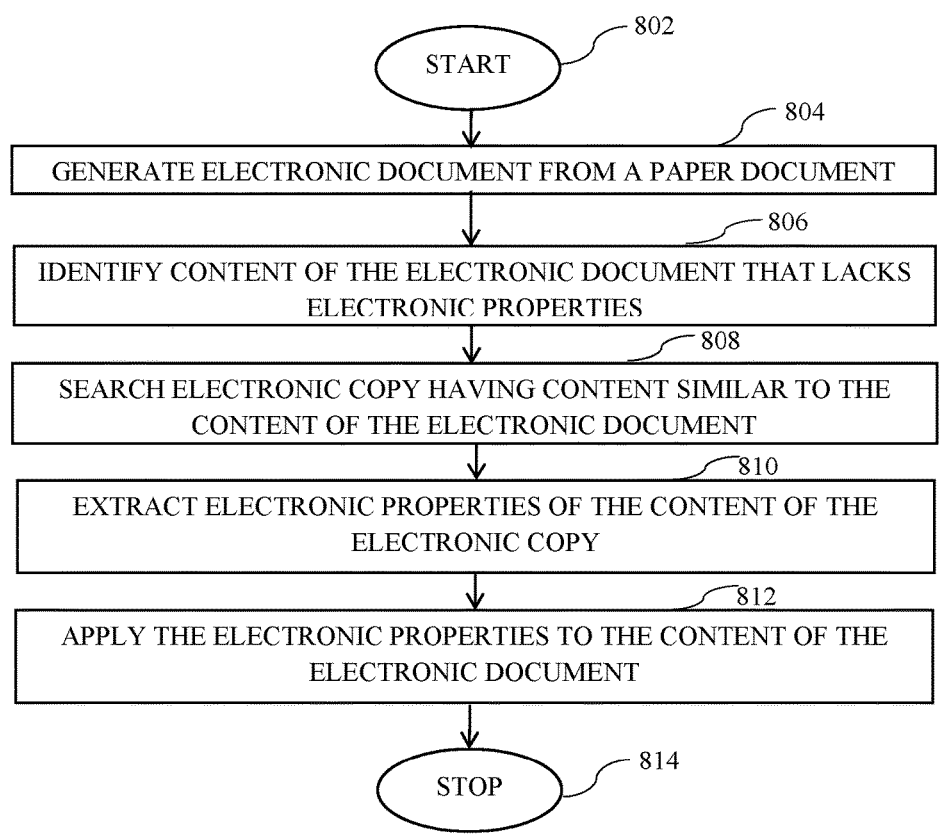
FIG. 8 is a flowchart of a method for adding electronic properties to an electronic document, according to one embodiment.

FIG. 8 is a flowchart of a method for adding electronic properties, such as the electronic properties 122, to electronic document, such as the electronic document 110, according to one embodiment.

In one embodiment, the method is performed by an electronic device, such as the user device 208. In another embodiment, the method is performed by a combination of the user device 208 and the document processing server 214.

The method starts at step 802 and proceeds to step 804.

At step 804, the electronic document is generated from a paper document. The electronic document lacks electronic properties as compared to an original electronic document from which the paper document was created. The electronic document is generated by at least one of scanning the paper document or imaging the paper document or capturing the paper document via a camera. In some embodiments, the electronic document may also be generated by capturing screen content of a screen. In such embodiments too, the electronic document so generated lacks the electronic properties.

At step 806, content of the electronic document that lacks the electronic properties is identified. The identification is performed using text recognition techniques or optical character recognition (OCR) techniques.

At step 808, an electronic copy having content similar to the content of the electronic document is searched. In some embodiment, the content of the electronic copy may not be exactly similar to the content of the electronic document. For a document to be considered as the electronic copy, content of the document should have at least document-threshold-value of similarity with the content of the electronic document. The document-threshold-value of similarity indicates that any two document having similarity greater than or equal to the document-threshold-value will result in one document being a search result for the other.

In some embodiments, the content of the electronic document is fragmented. The fragmentation can occur in scenarios when no search result is found for entire content of the electronic document or when the paper document is a superset of one or more electronic documents or the user chooses a fragmentation option or based on any other scenario that calls for fragmentation.

In one embodiment, the fragmentation is performed on a page by page basis. Each page is considered as a fragment. Content on a first page of the electronic document is used for searching. A first document having a page that has content either similar to the content of the first page or that has content having at least page-threshold value of similarity with the content of the first page is identified as the electronic copy. The first document is also referred to as a first document page. Similarly, content on a second page of the electronic document is then used for searching. A second document having a page that has content either similar to the content of the second page or that has content having at least page-threshold value of similarity with the content of the second page is identified as the electronic copy. The second document is also referred to as a second document page. The first document page and the second document page may be from a single document or different documents.

In another embodiment, the fragment may include more than one page or can be based on sections or any other parameter of the electronic document. Content of a first fragment of the electronic document is used for searching. A first document having a fragment that has content either similar to the content of the first fragment or that has content having at least fragment-threshold value of similarity with the content of the first fragment is identified as the electronic copy. The first document is also referred to as a first document fragment. Similarly, content of a second fragment of the electronic document is then used for searching. A second document having a fragment that has content either similar to the content of the second fragment or that has content having at least fragment-threshold value of similarity with the content of the second fragment is identified as the electronic copy. The second document is also referred to as a second document fragment. The first document fragment and the second document fragment may be from a single document or different documents.

At step 810, electronic properties of the content of the electronic copy is extracted. The extraction includes parsing the content to check presence of the electronic properties.

At step 812, the electronic properties are applied to the content of the electronic document to generate electronic document with the electronic properties. The generated electronic document with the electronic properties is similar to the original electronic document. For example, the image on the paper document is converted to video if the original electronic document has a video instead of the image. Having electronic properties in the electronic document make it feel real and original. Hence, the technical problem of the electronic document lacking the electronic properties when generated from the paper document is solved by providing a technical solution that identifies content of the electronic document that lacks the electronic properties, uses the content to search for an electronic copy, extracts the electronic properties of content of the electronic copy, and applies the electronic properties to the content of the electronic document to generate the electronic document with the electronic properties.

The method stops at 814.

Figure 9:
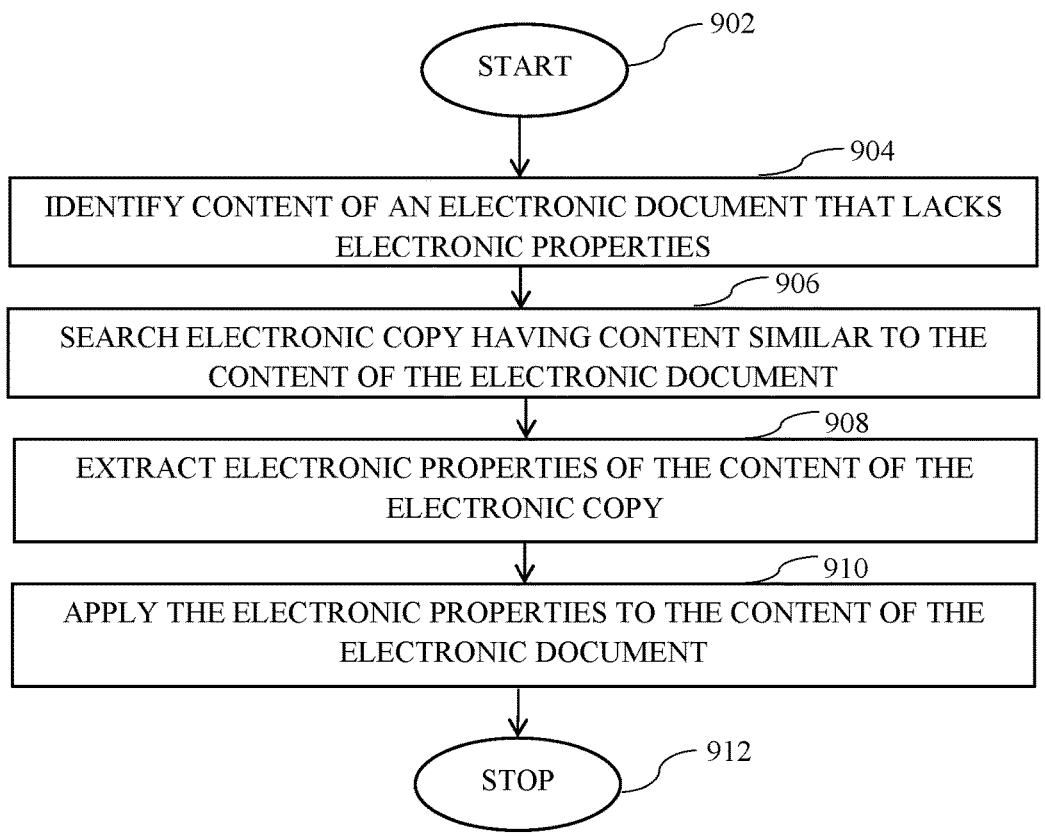
FIG. 9 is a flowchart of a method for adding electronic properties to an electronic document, according to another embodiment.

FIG. 9 is a flowchart of a method for adding electronic properties, such as the electronic properties 122, to electronic document, such as the electronic document 110, according to one embodiment.

In one embodiment, the method is performed by an electronic device, such as the user device 208. In another embodiment, the method is performed by a combination of the user device 208 and the document processing server 214.

In yet another embodiment, the method is performed by the document processing server 214.

The method starts at step 902 and proceeds to step 904.

The electronic document is generated from a paper document and provided to the method at step 902, i.e. the start. The electronic document lacks electronic properties as compared to an original electronic document from which the paper document was created.

At step 904, content of the electronic document that lacks the electronic properties is identified. The identification is performed using text recognition techniques or optical character recognition (OCR) techniques.

At step 906, an electronic copy having content similar to the content of the electronic document is searched. In some embodiment, the content of the electronic copy may not be exactly similar to the content of the electronic document. For a document to be considered as the electronic copy, content of the document should have at least document-threshold-value of similarity with the content of the electronic document. The document-threshold-value of similarity indicates that any two document having similarity greater than or equal to the document-threshold-value will result in one document being a search result for the other.

In some embodiments, the content of the electronic document is fragmented. The fragmentation can occur in scenarios when no search result is found for entire content of the electronic document or when the paper document is a superset of one or more electronic documents or the user chooses a fragmentation option or based on any other scenario that calls for fragmentation.

In one embodiment, the fragmentation is performed on a page by page basis. Each page is considered as a fragment. Content on a first page of the electronic document is used for searching. A first document having a page that has content either similar to the content of the first page or that has content having at least page-threshold value of similarity with the content of the first page is identified as the electronic copy. The first document is also referred to as a first document page. Similarly, content on a second page of the electronic document is then used for searching. A second document having a page that has content either similar to the content of the second page or that has content having at least page-threshold value of similarity with the content of the second page is identified as the electronic copy. The second document is also referred to as a second document page. The first document page and the second document page may be from a single document or different documents.

In another embodiment, the fragment may include more than one page or can be based on sections or any other parameter of the electronic document. Content of a first fragment of the electronic document is used for searching. A first document having a fragment that has content either similar to the content of the first fragment or that has content having at least fragment-threshold value of similarity with the content of the first fragment is identified as the electronic copy. The first document is also referred to as a first document fragment. Similarly, content of a second fragment of the electronic document is then used for searching. A second document having a fragment that has content either similar to the content of the second fragment or that has content having at least fragment-threshold value of similarity with the content of the second fragment is identified as the electronic copy. The second document is also referred to as a second document fragment. The first document fragment and the second document fragment may be from a single document or different documents.

At step 908, electronic properties of the content of the electronic copy is extracted. The extraction includes parsing the content to check presence of the electronic properties.

At step 910, the electronic properties are applied to the content of the electronic document to generate electronic document with the electronic properties. The generated electronic document with the electronic properties is similar to the original electronic document. For example, the image on the paper document is converted to video if the original electronic document has a video instead of the image. Having electronic properties in the electronic document make it feel real and original. Hence, the technical problem of the electronic document lacking the electronic properties when generated from the paper document is solved by providing a technical solution that identifies content of the electronic document that lacks the electronic properties, uses the content to search for an electronic copy, extracts the electronic properties of content of the electronic copy, and applies the electronic properties to the content of the electronic document to generate the electronic document with the electronic properties.

The method stops at 912.

It will be appreciated that order of steps described in various embodiments can vary. For example, in some embodiments, the searching for all fragments is done followed by extraction and addition of the electronic properties while in other embodiments, the searching for one fragment is done followed by extraction and addition of the electronic properties for the one fragment followed by searching for another fragment followed by extraction addition of the electronic properties for another fragment. Also, some of the steps can be performed in real time or offline. Other variations are also possible and are covered within scope of this description.

The embodiments of the present invention may be embodied as methods, apparatus, electronic devices, and/or non-transient or non-transitory computer program products or computer readable medium. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable medium having computer-usable or computer-readable program code embodied in the non-transient or non-transitory medium for use by or in connection with an instruction execution apparatus. In the context of this document, a computer-usable or computer-readable medium may be any medium that can contain, store, communicate, propagate, or transport the program for use by or in connection with the instruction execution apparatus, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

Examples of the computer-usable or computer-readable medium include, but are not limited to, an electronic, magnetic, optical, electromagnetic, infrared, or semiconductor apparatus, apparatus, device, or propagation medium. More specific examples (a non-exhaustive list) of the computer-readable medium or non-transient computer-readable medium or non-transitory computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like or in scripting language, such as Perl, Python, PHP, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance.

In the foregoing detailed description, numerous specific details are set forth to provide a thorough understanding of claimed subject matter. However, it will be understood by those skilled in the art that claimed subject matter may be practiced without these specific details. For example, the claimed subject matter may be practiced by using different gestures or icons than that described. In other instances, methods or apparatuses that would be known by one of ordinary skill have not been described in detail so as not to obscure claimed subject matter.

Some portions of the detailed description are presented in terms of algorithms or symbolic representations of operations on binary digital signals stored within a memory of a specific apparatus or specific electronic device or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Unless specifically stated otherwise, as apparent from the following discussion, it is appreciated that throughout this specification discussions utilizing terms such as "processing," "displaying," "receiving," "providing" or the like refer to actions or processes of a specific apparatus, such as a special purpose computer or a similar special purpose electronic device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic device.

Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

What is claimed is:

1. A computer-implemented method for adding an electronic property to electronically converted paper documents, the method comprising:
   generating a converted electronic document from a paper document;
   automatically fragmenting the converted electronic document into fragments;
   identifying content of each fragment of the converted electronic document;
   searching for one or more electronic documents corresponding to the converted electronic document using the content from multiple fragments;
   identifying a first electronic document corresponding to a first fragment;
   identifying a second electronic document corresponding to a second fragment, the first and second electronic documents comprising different documents;
   extracting electronic properties from the first and second electronic documents; and
   applying the electronic properties extracted from the first and second electronic documents to the content of the converted electronic document.

2. The method as claimed in claim 1, wherein generating the converted electronic document comprises at least one of:
   scanning the paper document; and
   capturing a document via a camera.

3. The method as claimed in claim 1, wherein searching for one or more electronic documents comprises:

identifying a document, having at least document-threshold-value of similarity with the content of the converted electronic document, as the second electronic document.

4. The method as claimed in claim 1, wherein searching for one or more electronic documents comprises:
using content on a first page of the converted electronic document for searching; and
identifying a first document page, having at least page-threshold-value of similarity with the content of the first page of the converted electronic document, as the first electronic document.

5. The method as claimed in claim 4, wherein searching for one or more electronic copies further comprises:
using content on a second page of the converted electronic document for searching; and
identifying a second document page, having at least page-threshold-value of similarity with the content of the second page of the converted electronic document, as the second electronic document.

6. The method as claimed in claim 1, wherein electronic properties comprise at least one of: hyperlink, font, character, paragraph styling, animation, video, slideshow, or color absent in the paper document.

7. The method as claimed in claim 1, wherein the content comprises at least one of text and image.

8. An system for adding an electronic property to electronically converted documents, the system comprising:
a memory; and
one or more processors electronically coupled to the memory, the one or more processors, in conjunction with the memory, programmed to cause the system to perform:
automatically fragmenting a converted electronic document into fragments;
identifying content of each fragment of the converted electronic document;
searching for one or more electronic documents corresponding to the converted electronic document using the content from multiple fragments;
identifying a first electronic document corresponding to a first fragment;
identifying a second electronic document corresponding to a second fragment, the first and second electronic documents comprising different documents;
extracting electronic properties from the first and second electronic documents; and
applying the electronic properties extracted from the first and second electronic documents to the content of the converted electronic document.

9. The system as claimed in claim 8, wherein the converted electronic document lacks electronic properties and is generated by at least one of:
scanning a paper document; and
capturing a document via a camera.

10. The system as claimed in claim 8, wherein searching comprises:
identifying a document, having at least document-threshold-value of similarity with the content of the converted electronic document.

11. The system as claimed in claim 8, wherein searching for one or more electronic documents comprises:
using content of a first fragment of the converted electronic document for searching; and
identifying a first document fragment, having at least fragment-threshold-value of similarity with the content of the first fragment of the converted electronic document, as the first electronic document.

12. The system as claimed in claim 11, wherein searching for one or more electronic documents further comprises:
using content of a second fragment of the converted electronic document for searching; and
identifying a second document fragment, having at least fragment-threshold-value of similarity with the content of the second fragment of the converted electronic document, as the second electronic document.

13. The system as claimed in claim 8, wherein the electronic properties comprise at least one of: hyperlink, font, character, paragraph styling, animation, video, slideshow, or color, absent in the converted electronic document.

14. The system as claimed in claim 8, wherein the content comprises at least one of text and image.

15. The system as claimed in claim 8 and further comprising a camera for generating the converted electronic document.

16. A transitory computer readable medium storing computer instructions that when executed by at least one processor causes a computing device to:
generate a converted electronic document from a paper document;
automatically fragment the converted electronic document into fragments;
identify content of each fragment of the converted electronic document;
search for one or more electronic documents corresponding to the converted electronic document using the content from multiple fragments;
identify a first electronic document corresponding to a first fragment;
identify a second electronic document corresponding to a second fragment, the first and second electronic documents comprising different documents;
extract electronic properties from the first and second electronic documents; and
apply the electronic properties extracted from the first and second electronic documents to the content of the converted electronic document.

17. The computer readable medium as claimed in claim 16, wherein the instructions, when executed by the at least one processor, cause the computing device to search for one or more electronic documents by:
identifying a document, having at least document-threshold-value of similarity with the content of the converted electronic document, as the second electronic document.

18. The computer readable medium as claimed in claim 16, wherein the instructions, when executed by the at least one processor, cause the computing device to search for one or more electronic documents by:
using content on a first page of the converted electronic document for searching; and
identifying a first document page, having at least page-threshold-value of similarity with the content of the first page of the converted electronic document, as the first electronic document.

19. The computer readable medium as claimed in claim 18, wherein the instructions, when executed by the at least one processor, cause the computing device to search for one or more electronic documents by:
using content on a second page of the converted electronic document for searching; and
identifying a second document page, having at least page-threshold-value of similarity with the content of the second page of the converted electronic document, as the second electronic document.

20. The computer readable medium as claimed in claim 16, wherein the electronic properties comprise at least one of: hyperlink, font, character, paragraph styling, animation, video, slideshow, or color absent in the paper document.

* * * * *